United States Patent
Nihei et al.

(10) Patent No.: US 8,145,356 B2
(45) Date of Patent: Mar. 27, 2012

(54) ROBOT CONTROLLER FOR HALTING A ROBOT BASED ON THE SPEED OF A ROBOT HAND PORTION

(75) Inventors: Ryo Nihei, Yamanashi (JP); Tetsuaki Kato, Yamanashi (JP); Takeaki Aramaki, Yamanashi (JP); Tomoyuki Yamamoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 604 days.

(21) Appl. No.: 12/191,486

(22) Filed: Aug. 14, 2008

(65) Prior Publication Data
US 2009/0088898 A1 Apr. 2, 2009

(30) Foreign Application Priority Data

Sep. 27, 2007 (JP) ................................. 2007-251957

(51) Int. Cl.
*G05B 19/18* (2006.01)
(52) U.S. Cl. ............ 700/256; 700/245; 700/250; 901/2; 901/9; 901/49
(58) Field of Classification Search .................. 700/245, 700/250, 256; 901/2, 9, 49
See application file for complete search history.

(56) References Cited

U.S. PATENT DOCUMENTS

| | | | | | |
|---|---|---|---|---|---|
| 4,718,078 | A | * | 1/1988 | Bleidorn et al. | 700/256 |
| 4,734,866 | A | * | 3/1988 | Bartelt et al. | 700/256 |
| 5,440,213 | A | * | 8/1995 | Arita et al. | 318/568.11 |
| 6,208,105 | B1 | * | 3/2001 | Kato et al. | 318/568.24 |
| 6,293,750 | B1 | * | 9/2001 | Cohen et al. | 414/744.4 |
| 2005/0246062 | A1 | * | 11/2005 | Keibel | 700/245 |
| 2007/0263760 | A1 | * | 11/2007 | Taillandier | 376/261 |
| 2008/0150467 | A1 | * | 6/2008 | Hashimoto et al. | 318/568.17 |

FOREIGN PATENT DOCUMENTS

| | | | |
|---|---|---|---|
| EP | 1332841 A2 | | 8/2003 |
| JP | 03-108008 A | | 5/1991 |
| JP | 03108008 A | * | 5/1991 |
| JP | 06-091587 A | | 4/1994 |
| JP | 06091587 A | * | 4/1994 |
| JP | 62-043710 A | | 3/1996 |
| JP | 10-264080 | | 10/1998 |
| JP | 10264080 A | * | 10/1998 |

OTHER PUBLICATIONS

Notice of Reasons for Rejection for JP2007-251957 mailed Dec. 16, 2008.
EP Search Report for EP08014715 mailed Jul. 9, 2009.

* cited by examiner

*Primary Examiner* — Mary Cheung
*Assistant Examiner* — Truc M Do
(74) *Attorney, Agent, or Firm* — Lowe Hauptman Ham & Berner LLP

(57) ABSTRACT

A robot includes a traveling rail supported by struts, and a robot body attached to a slider that slides on the traveling rail. A robot controller includes a speed calculation device for calculating moving speeds of the robot hand portion on the coordinate axes of a rectangular coordinate system set for the robot controller; a comparator device for comparing the moving speeds on the coordinate axes calculated by the speed calculation device with threshold values on the coordinate axes of the rectangular coordinate system, respectively; and a halting device for halting the robot in case at least any one of the moving speeds is higher than the corresponding threshold value.

2 Claims, 4 Drawing Sheets

ROBOT CONTROLLER FOR HALTING A ROBOT BASED ON THE SPEED OF A ROBOT HAND PORTION

RELATED APPLICATIONS

The present application is based on, and claims priority from, Japanese Application Number 2007-251957, filed Sep. 27, 2007, the disclosure of which is hereby incorporated by reference herein in its entirety.

BACKGROUND OF THE INVENTION

1. Field of the Invention

This invention relates to a robot controller for controlling an industrial robot (hereinafter referred to as "robot"). More specifically, the invention relates to a robot controller for stopping a robot based on the speed of a robot hand portion.

2. Description of the Related Art

A robot used in a factory or the like may undergo an abnormal operation, due to abnormal hardware or software. However, it is an accepted practice to bring the robot into an emergency stop when the robot undergoes an abnormal operation.

Japanese Unexamined Patent Publication JP-A-6-91587 discloses a technology, which determines if the robot is in an abnormal situation when either the acceleration or the speed of the end portion of the robot arm becomes greater than a predetermined value. Japanese Unexamined Patent Publication JP-A-10-264080 discloses that if the robot is abnormally operating by comparing an index periodically prepared for detecting abnormal condition such as the moving speed of the tool end point of the robot with a reference value. According to JP-A-6-91587 and JP-A-10-264080, the robot is stopped when abnormal operation of the robot is detected.

A robot of the type of the top mount loader includes a traveling rail supported by struts and extending in a horizontal direction, and a robot body attached to a slider that slides on the traveling rail. The robot body has a robot hand portion at an end thereof. In the robot of the type of the top mount loader as described above, there is a case in which the robot body should move at a high speed along the traveling rail but is not required to move at a high speed in a direction perpendicular to the traveling rail.

However, it is not proper to exclude the probability of motion of the robot body in the direction perpendicular to the traveling rail by taking the safety into consideration. Therefore, the struts supporting the traveling rail should be strength enough to withstand a maximum speed of the robot body. However, fabricating the struts so as to withstand the maximum speed of the robot body involves a problem of an increase in the cost of producing the struts and the robot.

On the contrary, it is also allowable to adjust the robot so that it cannot exhibit its dynamic capability to its maximum degree in order to lower the strength required for the struts. However, this also results in a decrease in the moving speed of the robot of the type of the top mount loader along the traveling rail, which is the most important requirement. If the dynamic capability of the robot is limited in advance, therefore, there often occurs such a situation that the robot is not capable of effecting the operation practically required on the spot such as in the factory or the like place.

This invention was achieved in view of the above-mentioned circumstances and has an object of providing a robot controller which makes it possible to lower the strength required for the struts without limiting the dynamic capability of the robot.

SUMMARY OF THE INVENTION

In order to achieve the above object according to a first aspect, there is provided a robot controller for controlling a robot equipped with a robot hand portion, comprising:

speed calculation means for calculating moving speeds of the robot hand portion on the coordinate axes of a rectangular coordinate system set for the robot controller;

comparator means for comparing the moving speeds on the coordinate axes calculated by the speed calculation means with threshold values on the coordinate axes of the rectangular coordinate system, respectively; and halting means for halting the robot in case at least any one of the moving speeds is higher than the corresponding threshold value.

In other words, according to the first aspect, threshold values are set for each of the coordinate axes of the rectangular coordinate system. Upon suitably setting the threshold values on the coordinate axes, therefore, the robot can be halted in case the moving speed has exceeded the corresponding threshold value. Therefore, there is no need of limiting the dynamic capability of the robot in advance. This avoids the occurrence of such a situation that the robot is not capable of effecting the operation required on the spot.

A second aspect is concerned with the first aspect, wherein the robot includes a traveling rail supported by struts, and a robot body attached to a slider that slides on the traveling rail;

one coordinate axis of the rectangular coordinate system is in parallel with the traveling rail; and the halting means halts the robot in case at least either one of the moving speeds on the remaining coordinate axes of the rectangular coordinate system is higher than the corresponding threshold value.

In other words, according to the second aspect, the moving speed of the robot hand portion in the direction in parallel with the traveling rail is not compared with the threshold value. The robot is halted only when the moving speed in the direction perpendicular to the traveling rail is higher than the threshold value. In other words, the robot hand portion is allowed to move at its maximum speed in the direction in parallel with the traveling rail but its motion is limited in the direction perpendicular to the traveling rail. This makes it possible to lower the strength required for the struts for supporting the traveling rail.

A third aspect is concerned with the second aspect, wherein the threshold value of the one coordinate axis in parallel with the traveling rail on the rectangular coordinate system is set to be larger than the threshold values on the remaining coordinate axes.

In other words, according to the third aspect, the motion of the robot in the direction perpendicular to the traveling rail is suppressed relative to the operation in the direction in parallel with the traveling rail.

The above object, features and advantages as well as other objects, features and advantages will become obvious from the detailed description of a typical embodiment of the invention in conjunction with the accompanying drawings.

DETAILED DESCRIPTION

Figure 1:
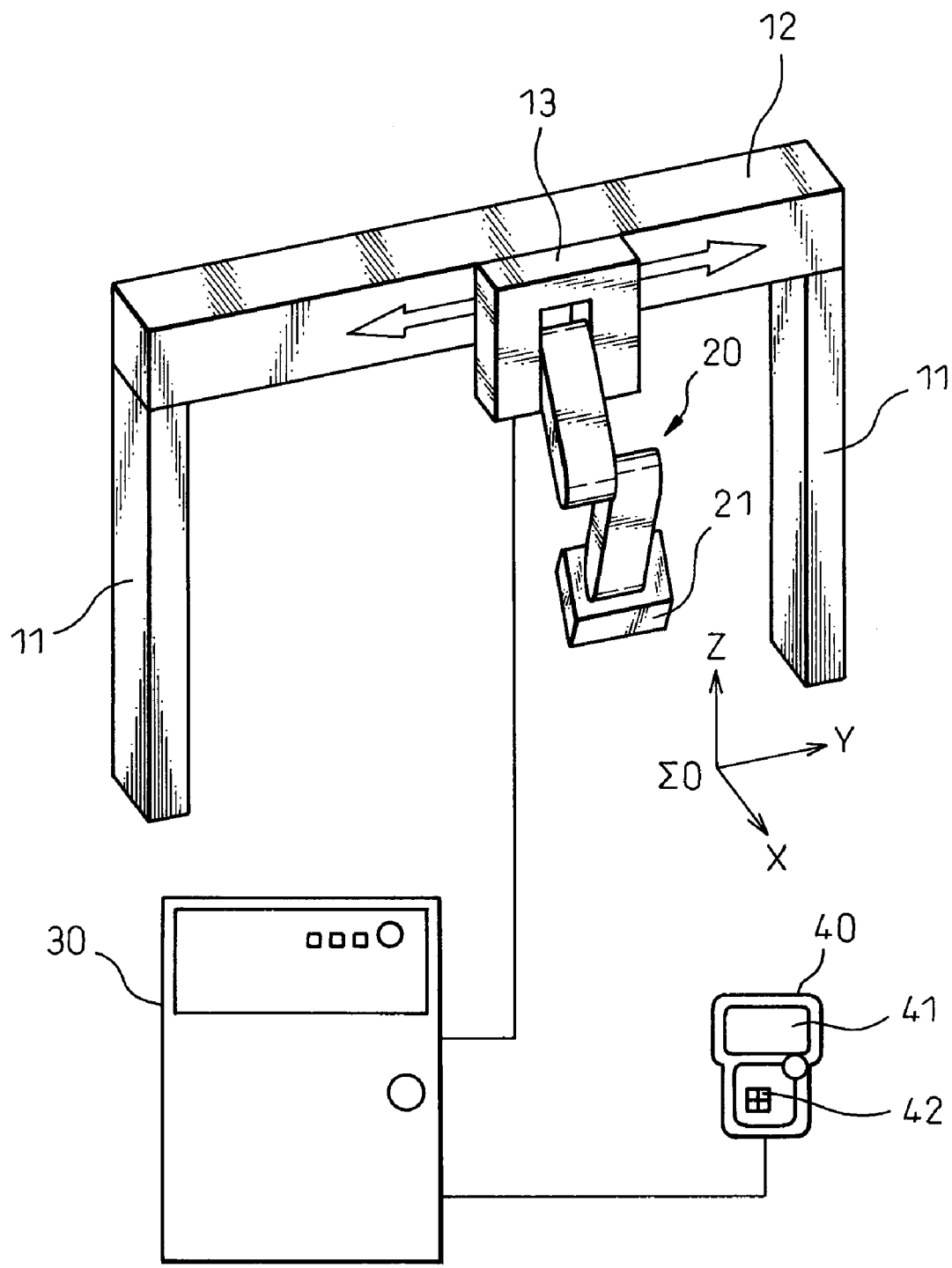
FIG. 1 is a diagram schematically illustrating a robot system equipped with a robot controller according to the invention.

An embodiment of the invention will now be described with reference to the accompanying drawings. In the drawings, the same members are denoted by the same reference numerals. For easy comprehension, the scales of the drawings are suitably varied.

FIG. 1 is a diagram schematically illustrating a robot system equipped with a robot controller according to the invention. FIG. 1 illustrates a robot of the type of the top mount loader. As shown, a traveling rail 12 extending in a horizontal direction is supported at both ends thereof by struts 11. A slider 13 is slidably provided on the side surface of the traveling rail 12.

As shown in FIG. 1, a robot body 20 comprising a multi-articulated arm is attached to the slider 13. The robot body 20 is equipped with a robot hand portion 21 at an end thereof. As can be seen from FIG. 1, the robot body 20 can be slid along the side surface of the traveling rail 12.

Further, a robot controller 30 for controlling the robot body 20 is connected to the slider 13. The robot controller 30 sets a three-dimensional rectangular coordinate system $\Sigma 0$. As shown, the Y-axis of the rectangular coordinate system $\Sigma 0$ is in parallel with the traveling rail 12, the Z-axis is in a vertical direction, and the X-axis is perpendicular to the Y-axis and the Z-axis.

A teaching control board 40 equipped with an LCD 41 and a keyboard 42 is connected to the robot controller 30. The operator is allowed to inspect the data in the robot controller 30 through the LCD 41. By using the keyboard 42 of the teach control board 40, the operator can input and alter various programs and data of the robot controller 30.

Figure 2:
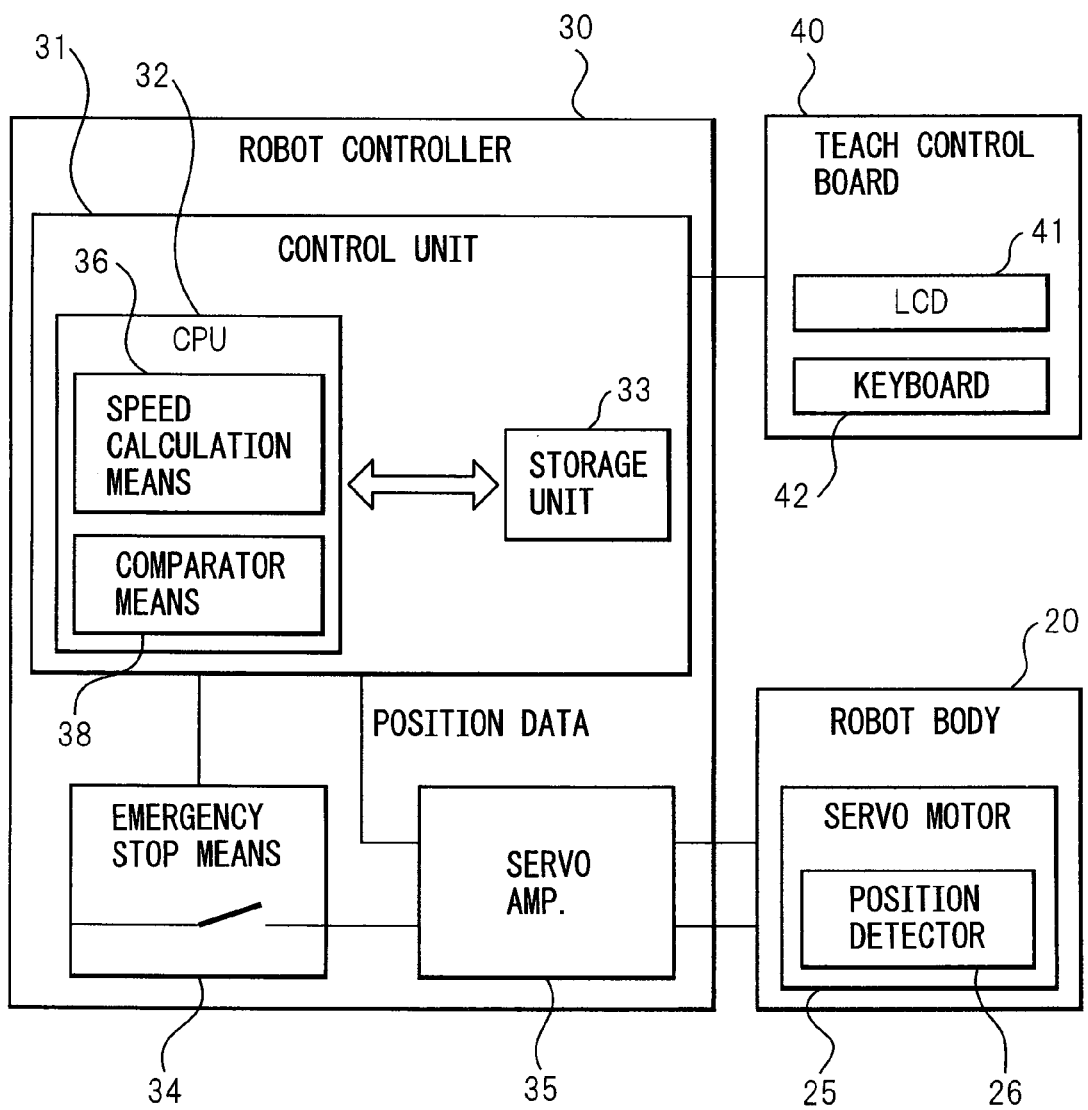
FIG. 2 is a diagram schematically illustrating the robot system shown in FIG. 1.

FIG. 2 is a diagram schematically illustrating the robot system shown in FIG. 1. As shown in FIG. 2, the robot controller 30 has a control unit 31 such as a digital computer that includes a CPU 32 and a storage unit 33. The CPU 32 has a function of speed calculation means 36 for calculating the moving speed of the robot hand portion 21 for each of the coordinate axes of the rectangular coordinate system $\Sigma 0$ and comparator means 38 for comparing the moving speeds of the coordinate axes with predetermined threshold values. Threshold values V0$x$, V0$y$ and V0$z$ on the coordinate axes (X-axis, Y-axis, Z-axis) having a function of a speed limit can be suitably set by the operator through the teach control board 40.

The threshold values that are set are stored in the storage unit 33 of the robot controller 30. The storage unit 33 includes a ROM storing various system programs, a RAM which the CPU 32 uses to temporarily store the data, and a nonvolatile memory for storing various programs related to the contents of operation of the robot, related setpoint values and the above threshold values.

A servo motor 25 mounted on an arm of the robot body 20 includes a position detector 26 such as an encoder. The position detector 26 detects the position of the rotary shaft of the servo motor 25, and transmits the position data to the control unit 31 through a servo amplifier 35. The servo amplifier 35 feeds the power to the servo motor 25 of the robot body 20. As shown in FIG. 2, the robot controller 30 includes emergency stop means 34 for interrupting the flow of electric current to the servo amplifier 35 upon receipt of an instruction from the control unit 31.

Figure 3:
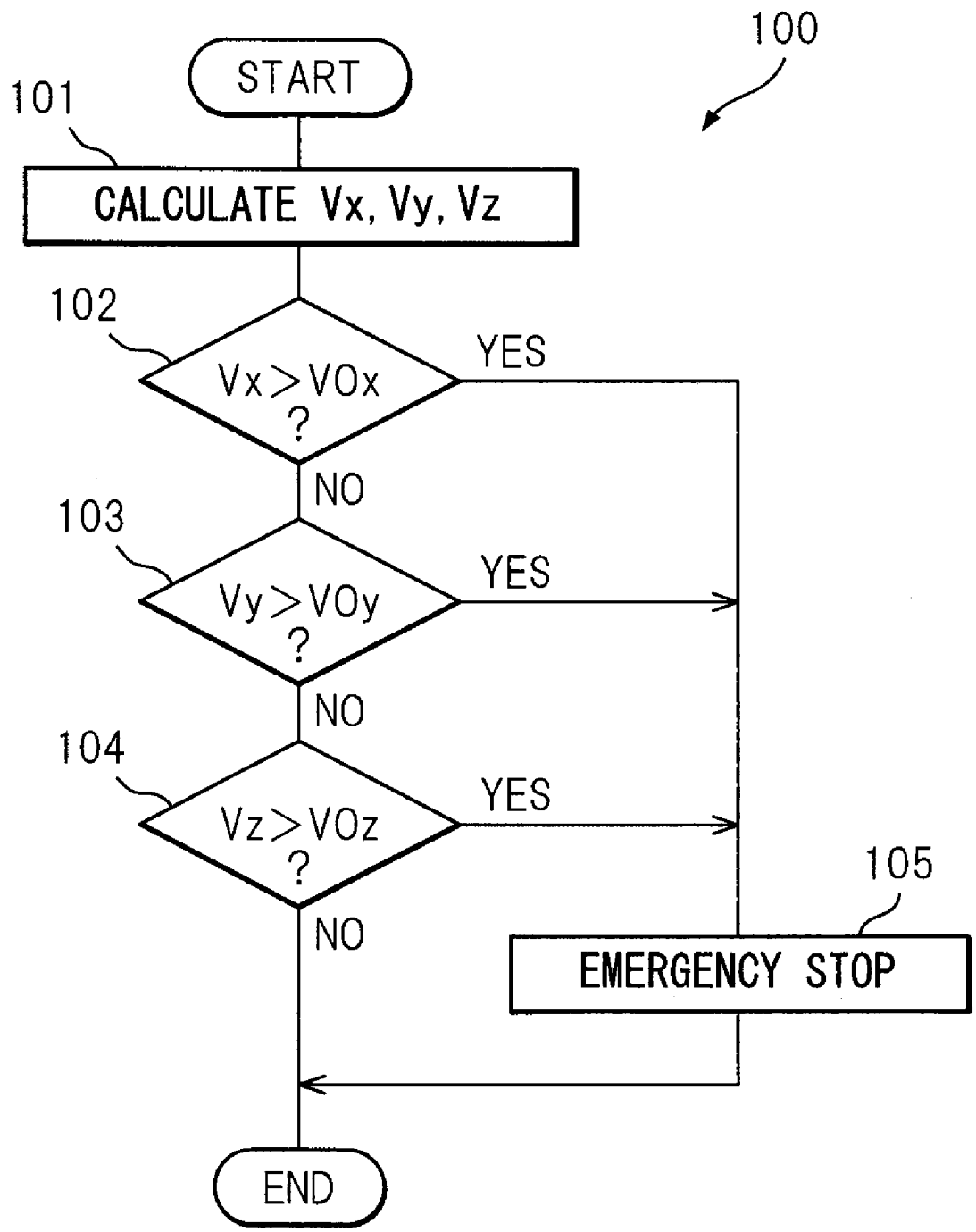
FIG. 3 is a flowchart illustrating the operation of the robot controller according to the invention.

FIG. 3 is a flowchart illustrating the operation of the robot controller according to the invention. The operation of the robot controller 30 according to the invention will now be described with reference to FIG. 3. The speed of the robot hand portion 21 is calculated at step 101 of the program shown in FIG. 3.

Figure 4:
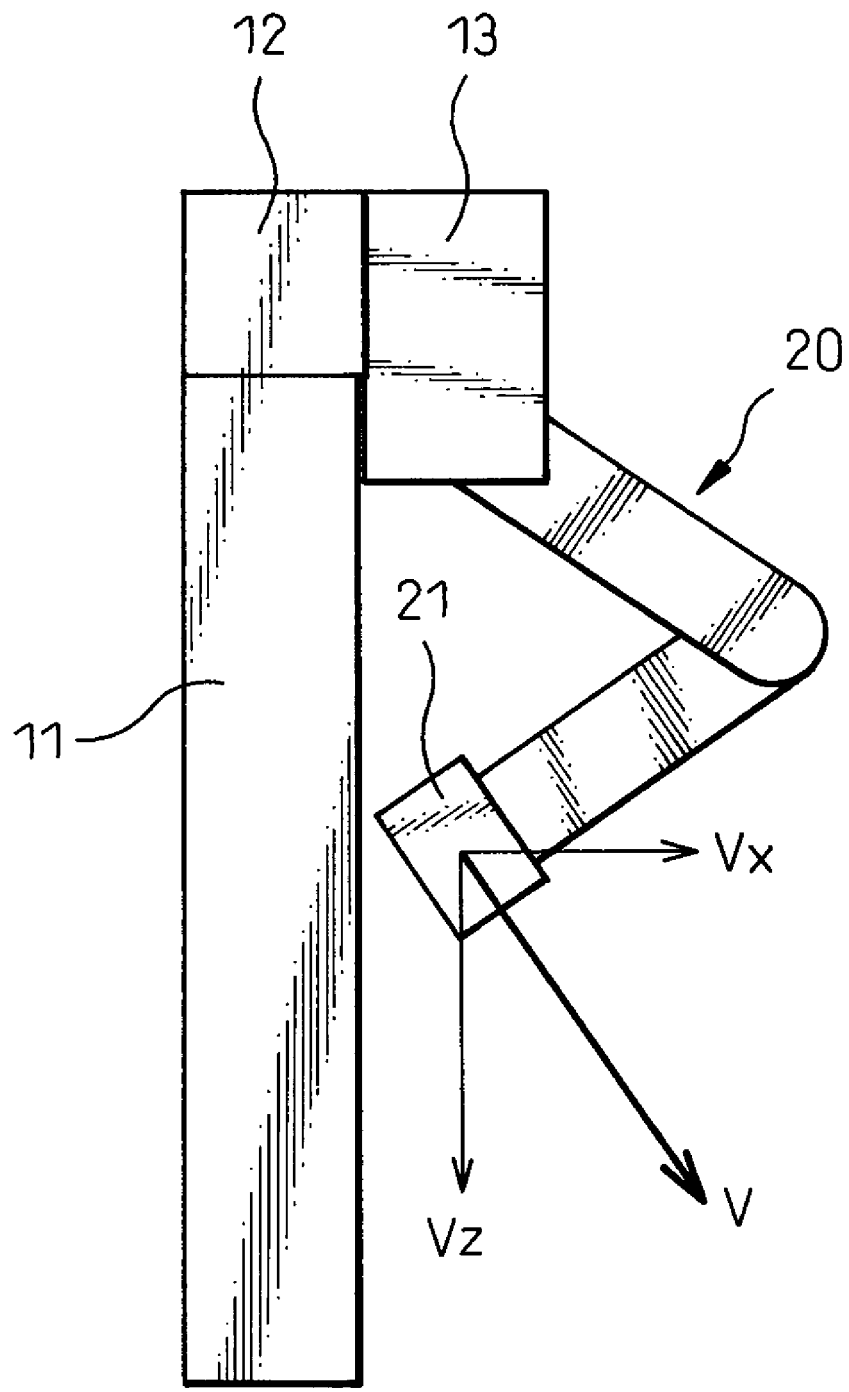
FIG. 4 is a side view of a robot body and a strut.

Then, speed calculation means 36 periodically calculates the speed V of the robot hand portion 21 based on the position data detected by the position detector 26. FIG. 4 is a side view of the robot body, etc. As can be seen from FIG. 4, the speed calculation means 36 decomposes the calculated speed V for each of the coordinate axes of the rectangular coordinate system $\Sigma 0$ and from which the speed Vx in the X-axis direction, the speed Vy in the Y-axis direction and the speed Vz in the Z-axis direction can be periodically calculated. In this connection, the Y-axis is in parallel with the traveling rail 12 and, therefore, the speed Vy in the Y-axis direction is not shown in FIG. 4.

Referring to FIG. 3 again, it is decided at step 102 if the speed Vx in the X-axis direction is greater than the threshold value V0$x$ related to the X-axis. If the speed Vx is greater than the threshold value V0$x$, the routine proceeds to step 105 where the emergency stop means 34 interrupts the flow of electric current to the servo amplifier 35. The robot body 20 comes into a halt since the servo motor 25 no longer receives the electric power.

If the speed Vx is not greater than the threshold value V0$x$, the routine proceeds to step 103. At step 103, it is decided if the speed Vy in the Y-axis direction is greater than the threshold value V0$y$ related to the Y-axis. If the speed Vy is greater than the threshold value V0$y$, the routine proceeds to step 105 where the emergency stop means 34 halts the robot body 20 in the same manner as above.

If the speed Vy is not greater than the threshold value V0$y$, the routine then proceeds to step 104. At step 104, it is decided if the speed Vz in the Z-axis direction is greater than the threshold value V0$z$ related to the Z-axis. If the speed Vz is greater than the threshold value V0$z$, the routine proceeds to step 105 where the emergency stop means 34 halts the robot body 20 in the same manner as above.

In the present invention, the threshold values V0$x$, V0$y$ and V0$z$ are determined for each of the coordinate axes (X-axis, Y-axis, Z-axis) of the rectangular coordinate system $\Sigma 0$. Therefore, the robot can be brought into a halt in case any one of the moving speeds Vx, Vy and Vz in the directions of coordinate axes becomes greater than the corresponding threshold value V0$x$, V0$y$ or V0$z$. When suitable threshold values V0$x$, V0$y$ and V0$z$ are set for the coordinate axes (X-axis, Y-axis, Z-axis), thus there is no need for limiting the dynamic capability of the robot in advance. Therefore, the present invention avoids the occurrence of such a situation that the robot is not capable of effecting the operation practically required on the spot such as in the factory or the like place.

Further, in the embodiment shown in FIG. 1, the Y-axis of the rectangular coordinate system $\Sigma 0$ is set to be in parallel with the traveling rail 12. Thus, the robot body 20 should be capable of moving in the Y-axis direction at a maximum speed. Therefore, the threshold value V0$y$ related to the speed Vy should be large enough for the struts 11 to withstand the maximum speed of the robot body 20.

On the contrary, the threshold values V0x and V0z related to the X-axis and the Z-axis perpendicular to the traveling rail 12 do not have to be large enough for the struts 11 to withstand the maximum speed of the robot body 20. Therefore, the threshold values V0x and V0z related to the speed Vx and the speed Vz are, usually, set to be smaller than the threshold value V0y related to the speed Vy.

Therefore, the operation of the robot in the direction perpendicular to the traveling rail 12 is suppressed relative to the operation in the direction in parallel with the traveling rail 12. Therefore, it is allowed to lower the strength required for the struts 11 that support the traveling rail 12. Further, it is possible to lower the cost of producing the struts 11 and the robot.

Further, as described above, the robot body 20 of the type of the top mount loader should be capable of moving at its maximum speed in the Y-axis direction. In other words, the speed Vy in the Y-axis direction does not have to be compared with the threshold value V0y. Therefore, the rectangular coordinate system Σ0 may be a two-dimensional rectangular coordinate system Σ0 comprising the X-axis and the Z-axis, and step 103 of FIG. 3 may be omitted. The embodiment in this case is also encompassed in the scope of the invention.

Though the invention was described above by way of a typical embodiment, it will be understood that a person those skill in the art will be able to effect the above alteration, various other modifications, omission and addition without departing from the scope of the invention.

The invention claimed is:

1. A robot controller for controlling a robot, in which a robot body, comprising a multi-articulated arm and equipped with a robot hand portion, is attached to a slider which slides on a traveling rail supported by struts, comprising:
    speed calculation means for calculating moving speeds of said robot hand portion and for converting the moving speeds into moving speeds of the robot hand portion on each of the coordinate axes of a rectangular coordinate system set for said robot controller, one coordinate axis of said rectangular coordinate system is in parallel with said traveling rail;
    comparator means for comparing said moving speeds on the coordinate axes calculated by said speed calculation means with threshold values on the coordinate axes of said rectangular coordinate system, respectively; and
    halting means for halting said robot in case at least any one of said moving speeds on the remaining coordinate axes which are perpendicular to said traveling rail is higher than the corresponding threshold value.

2. The robot controller according to claim 1, wherein the threshold value of said one coordinate axis in parallel with said traveling rail on said rectangular coordinate system is set to be larger than the threshold values on said remaining coordinate axes.

* * * * *